Patented Mar. 18, 1947

2,417,801

UNITED STATES PATENT OFFICE 2,417,801

FERMENTATION PROCESS

Charles Weizmann, London W. C. 1, England, assignor to Butacet Limited, London, England No Drawing. Application March 2, 1942, Serial No. 433,093. In Great Britain April 11, 1941

8 Claims. (Cl. 195—33)

This invention relates to fermentation processes and is based on the discovery that in cereal brans and in straw hydrolysates more than the easily fermentable carbohydrate present is converted into useful products by bacteria of the butylicus and butyricus group. The "easily fermentable carbohydrate" in a bran is generally considered to be the starch present therein and in a straw hydrolysate the reducing sugar present in solution. From both these types of carbohydrates one would expect to obtain about 33% by weight of the easily fermentable carbohydrate in form of neutral solvents, or about 40% in form of fatty acids. From the starting material mentioned above, more than these quantities of fermentation products can be obtained.

It is clear that this is due to the ability of the bacteria to attack cellulosic and hemicellulosic materials, i. e. difficultly fermentable insoluble substances, if enough easily fermentable carbohydrates are present. Straw hydrolysate differs in this respect from hydrolysates of similar materials such as wood, corn-stalks and leaves; it is my belief that in the hydrolysis of these latter materials, deleterious substances are formed or set free.

The object of the present invention is to provide fermentation processes utilizing straw as starting material.

It has now been found that cellulosic and hemicellulosic materials can be fermented directly by bacteria if a sufficient proportion of an easily fermentable carbohydrate is present. This easily fermentable carbohydrate is, in the case of rice-bran and wheat-bran and the like, the starch contained in these cereal materials, in the case of straw, the low molecular sugar which is formed by hydrolysis under the conditions indicated in this specification.

It has further been found that straw can be converted by appropriate means either mainly into acetone and butyl alcohol (neutral solvents) by means of *Clostridium acetobutylicum* (Weizmann) or other organisms capable of converting carbohydrates into substantial quantities of acetone and butyl alcohol or bacteria of the butyricus group, capable of converting the easily fermentable sugar into fatty acids, e. g. by such inocula as a soil culture or other organisms capable of converting carbohydrates into substantial quantities of fatty acids (butyric, acetic and/or propionic). Indeed the surprising fact has been discovered that both the organisms producing acetone-butanol and the fatty acid producing organisms are capable of fermenting considerable amounts of the carbohydrates, remaining in non-reducing form (insoluble) in the straw, although a partial degradation of the natural polysaccharidic form may have taken place in a hydrolytic treatment, for instance, the acid treatment referred to below.

A further object of the present invention is to provide fermentation processes utilizing the bran of cereals such as wheat, rice, and maize, as starting materials. It has been found that, as in the case of partly hydrolyzed straw, in the case of bran the fermentation of the starch present enables the bacteria to attack certain amounts of the cellulosic and hemicellulosic constituents (i. e. bulk) contained in the bran in non-reducing form and to ferment them to useful products.

The invention consists in a fermentation process which comprises the fermentation of an acid hydrolysate of straw either by organisms of the acetone-butyl alcohol forming type or by organisms of the fatty acid forming type, in which the hydrolysate is neutralized and without separation of the undissolved solid material from the liquid, and fermented.

The invention also consists in a fermentation process including the step suitable for a treatment of straw previous to fermentation, for instance by an acid hydrolysis, carried out by means of dilute sulphuric acid and under such conditions that a minimum of secondary decomposition of the low-molecular sugars formed takes place.

The invention also consists in fermentation processes substantially as hereinafter described in the examples.

The invention also consists in fermentation processes in accordance with the several claims.

The following nine examples illustrate how the invention may be carried into effect:

Example 1

*Fermentation of straw with soil culture.*—100 parts finely ground straw were hydrolyzed in the manner indicated above and, after neutralization with ammonia and the addition of 30 parts calcium carbonate, inoculated with 50 parts soil culture, prepared according to the description given below this example. The solution contained 29 parts reducing sugar. A vigorous fermentation (37° C.) set in after 5 hours and lasted for five days. No reducing sugar was found in the acidified and filtered solution, of which 90% were distilled off, containing practically all the acids formed. Their mixture consisted of:

| | Parts |
|---|---|
| Butyric acid | 2.5 |
| Propionic acid | 8.5 |
| Acetic acid | 5.2 |

Their total being equal to 58% of the reducing sugar present in the original hydrolysate.

1A. *Method for the production of a soil culture (bacteria of the butyricus group).*—5 parts of fresh soil from a beetroot bed is passed through a sieve of suitable mesh, mixed thoroughly with 10 parts calcium carbonate, and added to a mash prepared from 10 parts rice bran and 90 parts water, which had been heated at 120° C. for two hours and cooled down to room temperature. One brings the inoculum again to a temperature of 100° C. for two minutes, cools quickly, and incubates for two days at 37° C. The mash ferments actively, and is then ready for use. Inocula from sugar beet soil, carrot soil and the like may be prepared in the same manner. A further increase in activity can be obtained and the reproducibility of the results be improved upon by purifying the soil culture by means of plating it out on a suitable solid medium, e. g. yeast-dextrose-agar, isolating single colonies and propagating them in the usual manner.

The purification by this method, however, results usually in a loss of vigour. This can be restored by adding yeast autolysate to the mash. Obviously, on purification the bacterium or the mixture of bacteria loses its power to degrade protein to the necessary amino-acids.

Example 2

*Fermentation of straw with soil culture at 43° C.*—50 parts straw were treated as described in the previous example. The fermentation was conducted at 43° C., and went to completion in 4 days and a mixture of acids was formed, which contained, however, only propionic acid (86%) and acetic acid (14%). Their total 7.8 parts corresponds to 56% of the reducing sugar in the original hydrolysate.

Example 3

*Fermentation of straw with soil culture at 37° C. by mass inoculation.*—A suspension of 100 parts rice bran and 20 parts calcium carbonate in 900 parts water was heated for 2 hours at 120° C. and inoculated with 50 parts soil culture (e. g. prepared according to 1A, above). After 24 hours, the actively fermenting mash was poured into the sterile hydrolysate of 200 parts hydrolysed straw, prepared and neutralized as above and mixed with 60 parts calcium carbonate. The fermentation, which lasted 8 days, left no reducing sugar unconverted and gave a mixture of 30.5 parts butyric, 4.9 parts propionic, and 2.2 parts acetic acid.

As their total sum (37.6 parts) amounts only to 48% of the starch and reducing sugar present in the substrates, it is evident that under these conditions relatively less of the high-molecular carbohydrates is attacked. This concords with analogous observations in other cases.

Example 4

*Fermentation of straw with* Clostridium acetobutylicum *(mass inoculation).*—100 parts rice bran were heated with 900 parts water at 120° for 2 hours and then inoculated with a maize culture of *Clostridium acetobutylicum*. After 24 hours, the actively fermenting mash was added to a sterile hydrolysate of 150 parts straw, which had been exactly neutralized with calcium carbonate. Due to the developing high acidity, the fermentation was somewhat sluggish, lasting 11 days and leaving 1.9 parts reducing sugar unfermented. The amount of neutral solvents formed was 14.0 parts, the amount of acids, calculated as butyric acid 16.5 parts. The total amount of products (30.5 parts) corresponds to 47% of the starch plus reducing sugar present in the original substrates.

Example 5

*Fermentation of straw with* Clostridium acetobutylicum *(mass inoculation).*—The addition of excess calcium carbonate to the straw hydrolysate changes the course of the reaction favorably. 100 parts rice bran and 80 parts hydrolyzed straw, to which 20 parts calcium carbonate had been added, required for complete fermentation only 72 hours from the time the hydrolysate was inoculated as described in the previous example. Neutral solvents produced 13.1 parts, acids (calculated as butyric acids) 28.0 parts, total 41.1 parts=82% of starch+reducing sugar, present in the original substrates.

Example 6

*Fermentation of rice bran with soil culture.*—100 parts rice bran and 20 parts calcium carbonate in 900 parts water were heated at 120° C. for 2 hours, inoculated with 50 parts soil culture and incubated at 37° C. The fermentation lasted 4 days and gave 24.5 parts acids (calculated as butyric acid). This amount corresponds to 109% of the starch, so that evidently the pentosans and some of the hexosanic matter had been attacked too.

Example 7

*Fermentation of rice bran (100 parts) with* Clostridium acetobutylicum *under the conditions set out in the preceding example gave in 24 to 48 hours 21.1 gas, 8.6 parts neutral solvents and 4.7 parts acids (calculated as butyric acid). If the fermentation is carried out in presence of calcium carbonate (20 parts), the time required and the amount of gas produced is unchanged, but in the fermentation product the ratio is somewhat shifted towards the acids, of which 7.7 parts (calculated as butyric acid) together with only 6.9 parts neutral solvents were formed.

Example 8

*Fermentation of wheat bran with soil culture.*—The fermentation of 100 parts wheat bran under the conditions described in Example 6 lasted 7 days, after which time no reducing sugar was present in the solution. The reaction product consisted of acids only; their analysis proved the presence of

| | Parts |
|---|---|
| Butyric acid | 2.9 |
| Propionic | 8.0 |
| Acetic acid | 8.2 |

The total sum (19.1 parts) is nearly 2.5 times that expected under the assumption that only starch were fermented.

Example 9

*Fermentation of wheat bran with* Clostridium acetobutylicum.—Wheat bran differs from rice bran both in the time required for the completion of its fermentation and in its greater tendency to form fatty acids. This tendency is so marked even in the case of *Clostridium acetobutylicum*, that it is advantageous to ferment wheat bran in presence of calcium carbonate. 100 parts wheat bran, fermented as described in previous examples, in presence of 20 parts calcium carbonate, gave only 1.6 parts neutral solvents and 18.0 parts acids (calculated as butyric acid), together again about 2.5 times the quantity of products calculated on the basis of its starch content only.

General

Where above I have referred to calcium carbonate in excess, this means an amount of calcium carbonate equal to from about 1 to about 3 times the amount required for the neutralization of the acids expected.

The above examples show that straw can be converted by appropriate means either mainly into acetone and butyl alcohol by means of *Clostridium acetobutylicum* or into fatty acids by such inocula as a soil culture. The first step of the process consists in an acid hydrolysis which may be carried out by means of dilute sulphuric acid and under such conditions that a minimum of secondary decomposition of the low-molecular sugars formed takes place. Although the possible conditions can be varied considerably, it has been found advantageous to use 0.5% sulphuric acid in a ratio 9:1, calculated on the air-dry straw, and to carry out the hydrolysis for 3 hours at 140° C. In this way a practically colorless hydrolysate is obtained, which, without separation of the solid material from the liquid, contains 28% of the air-dry straw (12% water content) in form of reducing sugar. A quarter of this quantity is formed by pentoses, which, however, are fermented as easily as hexoses by the organisms of the butylicus or butyricus group.

In the second step the product of the hydrolysis is neutralized, for instance, without separation of the solid material from the liquid, either by ammonia or by calcium carbonate or partly by ammonia and partly by calcium carbonate, and is now ready for inoculation. This procedure has three advantages: it reduces the number of operations of which the process consists, it offers the bacteria the solid surface required for their activities and it permits them to extend their fermentative abilities not only to the reducing sugars and other easily fermentable carbohydrates, but also to—at least part of—the higher molecular carbohydrates present in the straw.

If the inoculation of the material, prepared as described above, is carried out by means of a culture, crude or purified through single colonies which is prepared from beet-root soil, sugar-beet soil, carrot soil or the like, a mixture of acids is formed. In this case, the fermentation has to be carried out in the presence of an excess of calcium carbonate. In this way, a solution of calcium salts of acetic, propionic and butyric acid is formed, from which the acids can be isolated and separated in the usual manner, if required. The relative amounts of the individual constituents of this mixture depend to a certain extent on such factors as the activity of the soil inoculum, and the conditions of fermentation and very markedly on the temperature: if the temperature of fermentation is raised from the normal 37° C. to 43° C., the formation of propionic acid becomes predominant.

A variation of this method consists in the application of "mass inoculation," i. e. by initiating the fermentation of the hydrolysate not by a relatively small quantity of inoculum, but by an actively fermenting mash, prepared from an easily fermentable material such as maize, rice bran or the like, so that the quantity of carbohydrates in the initiating mash is of the same order as that present in the straw hydrolysate. In the case of a fermenting cereal mash used for mass inoculation the starch content may range from about 0.5 to 2 times the quantity of sugars present in the straw hydrolysate to be fermented.

If the inoculation of the hydrolysate is carried out by means of *Clostridium acetobutylicum*; the method of mass inoculation is superior to any other one. Rice bran has been proved to be an especially favorable initiating substrate. As the fermentation of straw hydrolysate gives, even with this mainly acetone and butanol forming organisms invariably not insignificant amounts of fatty acids, it is advisable to add calcium carbonate in this case too, to the mash. In this way, the duration of the fermentation is considerably shortened, although even without this addition the reaction goes to practical completion.

In this specification, the bacteria used for the fermentation of straw hydrolysate are not limited to *Clostridium acetobutylicum* and the soil culture. Any bacterium capable of producing neutral solvents or fatty acids that is of the butyricus or butylicus group may be used instead.

The observation that these bacteria along with the reducing sugars are apt to ferment considerable amounts of higher-molecular, non-reducing carbohydrates, is not confined to straw hydrolysate in the limited interpretation of that word but extends to the general interpretation given above, for instance it has been observed that in materials which contain starch—a carbohydrate very easily fermented by most of the organisms of this group—together with cellulosic or hemicellulosic materials, the fermentation of the starch, by which it is converted into acetone and butyl alcohol or fatty acids, is invariably accompanied by an attack on the cellulosic materials. Such materials are rice bran, wheat bran and the like. Their fermentation involves not only the starch (22.5% and 20.0%) in the samples used in the examples referred to above, but also the pentosans (6.0% and 9.9% respectively) and even some of the hexosanic material. This can be concluded from the fact that the total amount of fermentation products is in every case higher than the 33 and 40% respectively, which previous experience would lead one to expect for the butylic and butyric fermentation, respectively.

I claim:

1. In the fermentation of carbohydrates, the process which comprises preparing a straw hydrolysate containing undissolved straw material without separation of the undissolved solid material from the liquid, inoculating this hydrolysate with a cereal mash, which is being actively fermented by bacteria of the class consisting of the butylicus and butyricus groups, said mash containing from about 0.5 to 2 times as much starch as the amount of sugar present in the straw hydrolysate, adding an excess of calcium carbonate to said liquid, allowing fermentation of the inoculated hydrolysate by means of the bacteria present in the cereal mash, at not above 43° C. until the fermentation of the mash is sufficiently accomplished, and until a portion of the insolubles in the straw hydrolysate has been fermented.

2. The process of claim 1 wherein said straw hydrolysate is produced by treating a straw with sulfuric acid having a concentration of about 0.5 per cent, in the ratio of about 9 parts acid to 1 part straw calculated on the air-dry basis, for about 3 hours at a temperature of about 140° C. and neutralizing the resulting hydrolysate.

3. The process of claim 1 wherein the fermenting straw hydrolysate is made substantially neutral.

4. In the production of any of the products acetone, butyl alcohol and fatty acids by the fermentation method, the process which comprises preparing a straw hydrolysate without separation of the solid material from the liquid, inoculating this hydrolysate with an actively fermenting cereal mash containing from about 0.5 to 2 times as much starch as the amount of sugar present in the straw hydrolysate, and maintaining the inoculated hydrolysate under conditions favorable for the ensuing fermentation thereof.

5. The process of claim 4 wherein said straw hydrolysate is produced by treating a straw with sulfuric acid having a concentration of about 0.5 per cent, in the ratio of about 9 parts acid to 1 part straw calculated on the air-dry basis, for about 3 hours at a temperature of about 140° C. and stopping such treatment before all of the straw material has been converted into soluble products, and neutralizing the resulting hydrolysate.

6. The process of claim 4 wherein the fermenting straw hydrolysate is made substantially neutral.

7. In the process of fermenting straw hydrolysate for the production of a material selected from the group consisting of acetone, butyl alcohol and fatty acids, the improvement which comprises employing in such a fermentation a straw hydrolysate prepared by treating a straw with a dilute acid until only a part of the cellulose material has been dissolved, and without separation of the resulting solid material from the liquid.

8. In the fermentation of a straw hydrolysate, the process which comprises preparing a straw hydrolysate, and, without separation of the undissolved solid material from the liquid, inoculating this hydrolysate with a cereal mash which is being actively fermented by bacteria selected from the group consisting of the butylicus and butyricus groups, said mash containing about the same amount of easily fermentable carbohydrates as that present in the said hydrolysate and maintaining the inoculated hydrolysate under conditions favorable for the ensuing fermentation thereof.

CHARLES WEIZMANN.

REFERENCES CITED

The following references are of record in the file of this patent:

UNITED STATES PATENTS

| Number | Name | Date |
|---|---|---|
| 1,602,306 | Langwell | Oct. 5, 1926 |
| 1,913,164 | Legg et al. | June 6, 1933 |
| 2,203,360 | Partansky | June 4, 1940 |